United States Patent [19]

McGee

[11] 4,047,697
[45] Sept. 13, 1977

[54] VALVE SEAT-TO-SEAT CONNECTION FOR EASY INSTALLATION AND REMOVAL OF SEAT

[75] Inventor: John K. McGee, Houston, Tex.

[73] Assignee: Gray Tool Company, Houston, Tex.

[21] Appl. No.: 562,182

[22] Filed: Mar. 26, 1975

[51] Int. Cl.² .................................................. F16K 3/00
[52] U.S. Cl. ..................................... 251/328; 251/362; 251/363; 251/364; 251/365
[58] Field of Search .............. 251/365, 364, 363, 362, 251/328, 316, 307, 172, 171

[56] References Cited

U.S. PATENT DOCUMENTS

| | | | |
|---|---|---|---|
| 2,585,658 | 2/1952 | Keller | 251/363 |
| 2,631,577 | 3/1953 | Carter | 251/363 X |
| 2,763,287 | 9/1956 | Dopp | 251/363 X |
| 3,006,599 | 10/1961 | Eckert | 251/328 X |
| 3,170,670 | 2/1965 | Johnstone | 251/328 X |
| 3,421,733 | 1/1969 | Stewart | 251/328 X |
| 3,765,440 | 10/1973 | Grove | 251/328 X |

Primary Examiner—Harold W. Weakley
Attorney, Agent, or Firm—Cushman, Darby & Cushman

[57] ABSTRACT

A valve seat - to - body connection, and an installation therefor. A resilient metallic ring having an inside diameter slightly smaller than the outside diameter of a valve body in which the seat member is to be installed, is placed around the section of the seat member. When the seat member is then inserted in the body, it provides initial sealing pressures, but is still readily detachable. Apparatus is provided for injecting a material of plastic consistency or the like into the area surrounding the metallic ring, which deforms the ring into fluid tight engagement with the seat member and the body. Additional seals may also be provided associated with the seat member.

11 Claims, 2 Drawing Figures

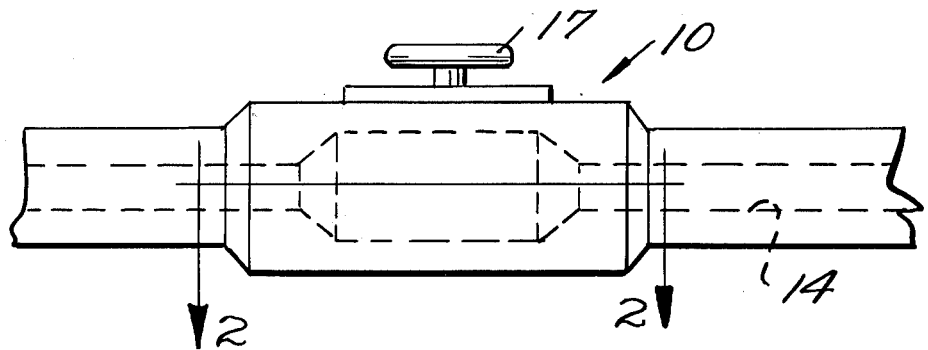
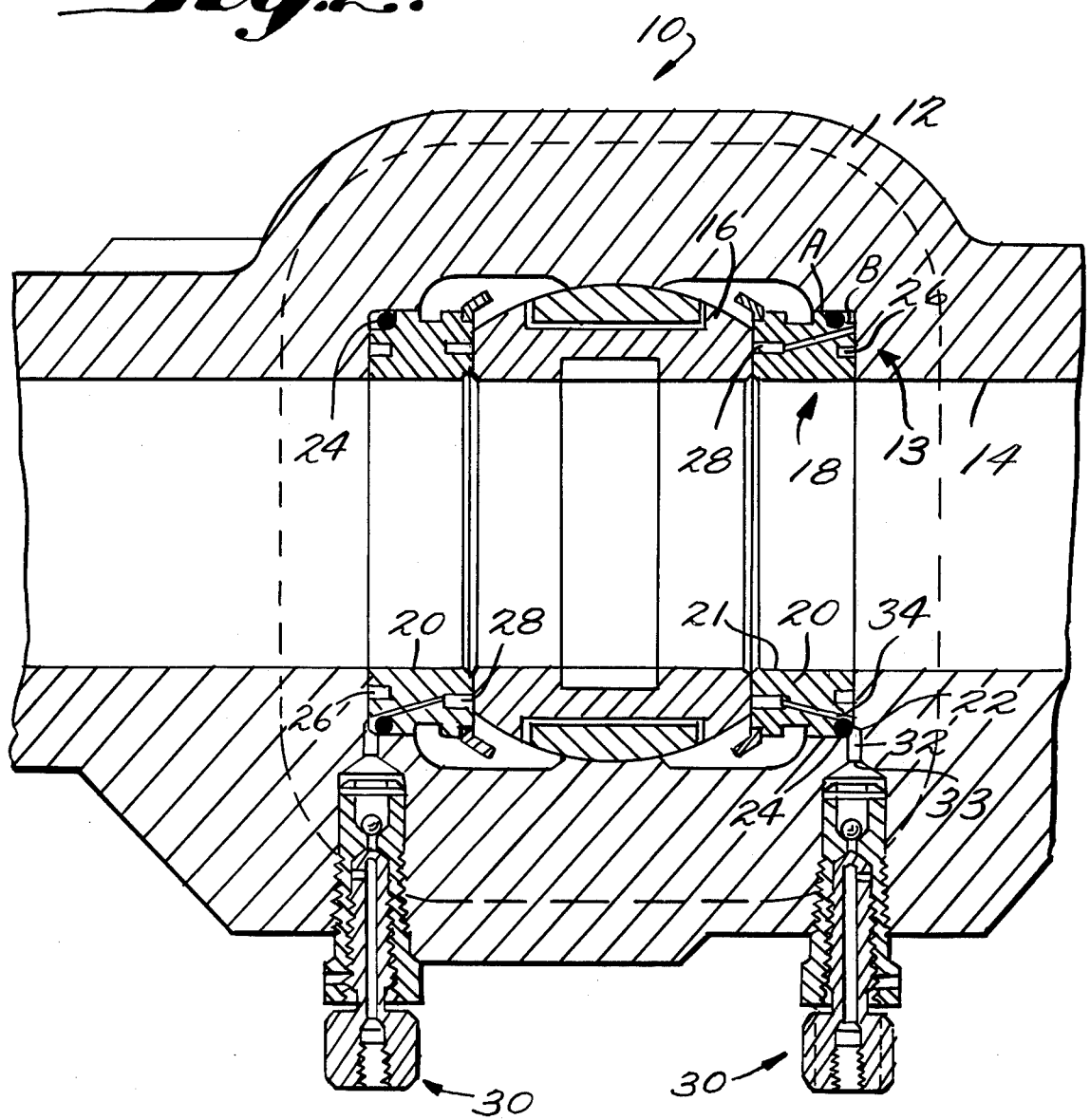

VALVE SEAT-TO-SEAT CONNECTION FOR EASY INSTALLATION AND REMOVAL OF SEAT

BACKGROUND AND SUMMARY OF THE INVENTION

The invention relates to a valve seat - to - body connection that provides for positive fluid tight sealing of the connection, while still allowing ready removal of the valve seat and the particular valve seat utilizable therein. The replacement of valve seats for high pressure environments has long posed many problems in the art. Normally, the tighter the fit, the better the seal, however the tighter the fit, the harder it is to remove.

In order to alleviate some of the problems raised by providing valve seat - to - body connections in high pressure and temperature environments, some manufacturers carry seats in stock with four or more "press fit" size ranges, while other manufacturers weld in the valve seats (making repair prohibitive), and still others settle for seats that have a very limited service range. It has been suggested that other ways could be provided for effecting a tight seal between a valve seat and body (or associated members). For instance, U.S. Pat. Nos. 3,166,291, 3,421,733, 3,752,178, and 3,765,440 suggest the introduction of a material of plastic consistency behind rubber or Teflon seal members for providing a back-up seal, and for forcing the rubber or Teflon members into tighter fitting engagement. U.S. Pat. No. 3,374,261 suggests such an introduction of a special material into a seal area after seal failure has occurred in order to "patch up" the failed seal.

While all of the above proposals can result in an effective seal, none of them can provide a valve seat - to - body connection that is normally readily detachable (while still having enough securement to prevent the valve seat from falling out during installation), allowing ready replacement thereof, yet may be selectively tightly sealed to prevent ready removal thereof and prevent fluid leakage between the valve seat and valve body even under conditions of continuous high pressure and high temperature. According to the present invention a valve seat is provided for furnishing a metal to metal seal between a valve seat and valve body that is easy to replace and that has a wide service range, not being affected by temperature, pressure, chemical attack, aging, etc.

According to the apparatus of the present invention, a valve seat body member having first and second sections of different outside diameter is provided. The valve seat is adapted to be mounted in a valve body section having a predetermined inside diameter slightly larger than but generally corresponding to the outside diameter of the first section of the valve seat member. A resilient metallic ring, preferably of tubular cross-section, is disposed around the second section of the valve seat member, the metallic ring having an inside diameter slightly greater than the outside diameter of the second section of the valve seat member, and having an outside diameter slightly greater than the inside diameter of the valve body section in which the valve seat member is mounted. When the valve seat member is inserted into the valve body, the metallic ring retains the valve seat member within the valve body, although the retention forces are relatively small, and the seat member can be readily detached. When it is then desired to seal the connection for operation under conditions of high pressure and temperature a material of plastic consistency or the like is then injected under pressure into the area surrounding the metallic ring (preferably the second section of the valve seat member is adjacent several different faces of the valve body), thereby deforming the resilient metallic ring and causing it to provide a fluid-tight metal-to-metal seal between the valve seat member and the valve body.

According to a method of using the apparatus the present invention, a metallic ring as described above is placed around a second section of a valve seat member, the valve seat member is inserted into a valve body (while remaining readily detachable therefrom), and the metallic ring is deformed by applying a material of plastic consistency or the like to the area surrounding the metallic ring, thereby providing a fluid-tight seal between the valve seat member and the valve body. The seat member may then again be made readily detachable by relieving the pressure of the plastic material or the like in the ring area.

It is the primary object of this invention to provide an improved valve seat - to - body seal, and installation thereof. This and other objects of the invention will become clear from an inspection of the detailed description of the invention, and from the appended claims.

BRIEF DESCRIPTION OF THE DRAWINGS

FIG. 1 is a side elevational view of an exemplary valve for utilizing the apparatus of the present invention; and FIG. 2 is a cross-sectional view taken along lines 2—2 of FIG. 1 showing in detail exemplary valve seat - to - body sealing means according to the present invention.

DETAILED DESCRIPTION OF THE INVENTION

A typical valve that may utilize the novel apparatus according to the present invention is shown generally at 10 in the drawings. The valve 10 preferably is a ball or a gate valve, but any type valve may utilize apparatus according to the present invention. The valve 10 includes a metallic valve body 12 having a bore 14 therein, a valve gate 16, which may be rotatable or translatable into position to block the bore 14, and a valve seat 18 interposed between the valve body 12 and the valve gate 16. The bore 14 is adapted to carry fluid under high pressure and temperature. The valve body 12 has a section 13 thereof adapted to receive the valve seat 18 therein, the inside diameter of the section 13 being slightly greater but generally corresponding to the outside diameter of a metallic valve seat body member 20 of valve seat 18.

The metallic valve seat body member 20 has a bore 21 therethrough corresponding to the bore 14 in body 12. The valve seat body member 20 also has a first section A thereof having an outside diameter that is slightly less but generally corresponds to the inside diameter of the section 13 of body 12, and the member 20 also has a second section B having an outside diameter less than the outside diameter of section A. Preferably the section B is located nearest to the bore 14 in body 12, furthermost into section 13 of body 12, for a reason to be explained hereinafter.

To provide some sealing while allowing ready detachment of the member 20 from the body 12, a resilient metallic ring 24 is provided, the ring 24 being adapted to be disposed around the section B of the member 20 in engagement with surface 22 thereof. Preferably the ring 24 is tubular in cross-section. The outside diameter of the ring 24 is slightly greater than the inside diameter of the section 13 of the body 12, and the inside diameter of the ring 24 is slightly less than the outside diameter of the section B of member 20. In this way, when the member 20 is inserted into mounted relationship with the body 12 (at section 13 thereof), the amount of interference developed between the ring 24 and body 12 and member 20 is enough to produce initial sealing pressures and to prevent the member 20 from "falling out" of engagement with the body 12, but is not enough to cause yielding of the resilient ring 24. The member 20 is thus also readily detachable from the body 12.

When it is desired to provide for completely fluid-tight sealing between the member 20 and body 12, sealing material of plastic consistency or the like (or other flowable material capable of supplying pressure), is injected into the area or channel 32 surrounding the ring 24 in the area of interengagement therebetween with body 12 and member 20. This material is injected under pressure through plastic injector 30 and causes deformation of the ring 24, providing for fluid-tight interengagement between the body 12 and member 20 despite any conditions of high-pressure and temperature. When the section B of member 20 is located furtherest within the section 14 of body 12, plastic material 33 or the like fills a large area between member 20 and body 12, and may effectively provide a secondary seal, in addition to the main seal provided by ring 24.

In order to provide even better fluid-tight engagement between the member 20 and body 12, and in order to provide fluid-tight engagement between the gate 16 and the member 20, sealing inserts 26 and 28 respectively may be provided. Insert 26 also serves to retain material 33 or the like in channel 32. Material of plastic consistency or the like 33, capable of exerting a pressure, when injected into area 32 also will pass through passageway 34 to pressurize insert 28, and will pass through another passageway (not shown) to pressurize insert 26, whereby fluid-tight engagements will be provided by inserts 26 and 28 between member 20 and body 12 and gate 16 respectively.

When practicing a method of using the apparatus according to the present invention, in order to mount a valve seat member 20 in a body 12, one places a resilient metallic ring 24 having an inside diameter thereof slightly less than the outside diameter of section B of member 20, and inserts the member 20 into the section 13 of body 12. The outside diameter of the ring 24 is slightly greater than the inside diameter of the section 13 of body 12. Initial sealing pressures are developed thereby, yet the member 20 is still readily removable.

After initial installation of the member 20 into body 12, material of plastic consistency 33 or the like is injected via plastic injector 30 into the passageways 32 surrounding the ring 24. The pressure of the material 33 causes deformation of the ring 24 resulting in fluid-tight engagement between the member 20 and the body 12, despite any conditions of high pressure or temperature, and also pressurizes inserts 26 and 28. When it is desired to remove member 20 for replacement of the valve seat, the plastic 33 under pressure is released via injector 30, and the member 20 is merely pulled away from the body 12, no permanent or difficult to detach connection being provided thereby.

It will thus be seen that apparatus and method have been provided that allow for easy replacement of a valve seat in a valve seat - to - body connection, while still allowing a fluid-tight interengagement between the body and seat despite conditions of high pressure and temperature. The invention has been herein shown and described in what is presently conceived to be the most practical and preferred embodiments, however it is to be understood that many modifications may be made thereof within the scope of the invention. For instance, a differently shaped valve body or seat member than those shown may be provided, as well as different means for pressurizing the ring 24. Other modifications are also possible, thus it is intended that the invention be accorded the full scope of the appended claims so as to encompass all equivalent structures and devices.

WHAT IS CLAIMED IS:

1. A valve assembly comprising
   a. a valve body, said body having a bore therein, and having a section thereof of a predetermined inside diameter for receipt of a valve seat body member,
   b. a valve seat body member having a bore therethrough, mounted in said valve body so that said bores are aligned and having a first section thereof having an outside diameter slightly less than but generally corresponding to said inside diameter of said valve body section, and having a second section thereof having an outside diameter less than the outside diameter of said first section, and
   c. means for mounting said valve seat body member in said valve seat body so that said valve seat body member is readily detachably mounted in said valve body while also being tightly sealable therewith, said means including (i) a resilient metallic ring disposed around said second section of said valve seat body member and in engaging relationship with said valve body and said valve seat body member, said metallic ring having an outside diameter slightly greater than the inside diameter of said section of said valve body in which said valve seat body member is mounted, and having an inside diameter slightly greater than the outside diameter of said second section of said valve seat body member, so that said ring will retain said valve seat body member within said valve body while still allowing ready detachment thereof, and (ii) means for selectively supplying a material under pressure to said ring to force said ring into tighter engagement with said valve seat body member and said valve body so that said valve seat body member is not readily detachable from said valve body and so that fluid leakage between said valve body and said valve seat body member is prevented.

2. An assembly as recited in claim 1 wherein said ring is tubular in cross-section.

3. An assembly as recited in claim 1 wherein said means for selectively supplying material under pressure to said ring includes means defining a fluid channel surrounding said ring.

4. An assembly as recited in claim 3 wherein said means for selectively supplying material under pressure to said ring further includes injector means for injecting a material of plastic consistency or the like under pressure into said channel.

5. An assembly as recited in claim 4 wherein said assembly further comprises additional means for providing fluid tight engagement between said valve body and said valve seat body member and for containing plastic material or the like in said channel, said means comprising a first insert contained by said valve seat body member and disposed in interengaging relationship with a surface of said valve body, and means defining a fluid passage in said valve seat body member for allowing the introduction of material under pressure into engagement with said first insert.

6. An assembly as recited in claim 4 wherein said assembly further comprises a valve gate operable to selectively allow and prevent passage of fluid under pressure through said bores, and means for providing fluid tight engagement between said valve seat body member and said valve gate, said means including a second insert contained by said valve seat body member and disposed in interengaging relationship with a surface of said valve gate, and means defining a fluid passage in said valve seat body member for allowing the introduction of material under pressure into engagement with said second insert.

7. An assembly as recited in claim 3 wherein said means defining said channel includes two different surfaces each of said valve seat body member, adjacent said second section, and said valve body.

8. A device for use as a valve seat in a valve body, the valve body having a bore therein and a section thereof for receipt of the valve seat, said section having a predetermined inside diameter, said device comprising
   a. a valve seat body member, said valve seat body member having a first section thereof having an outside diameter adapted to generally correspond to the inside diameter of valve body in which it is adapted to be inserted, and having a second section thereof having an outside diameter less than the outside diameter of said first section,
   b. a resilient metallic ring adapted to be disposed around said second section of said valve seat body, said metallic ring having an outside diameter adapted to be slightly greater than the inside diameter of a valve body section in which said valve seat body member is mounted, and having an inside diameter slightly greater than the outside diameter of said second section of said valve seat body member, so that said ring is adapted to retain said valve seat body member within a valve body while still allowing ready detachment thereof, and
   c. fluid channel defining means in said valve seat body member communicating with said second section of said valve seat body member, and a fluid channel defined by said channel defining means allowing the application of a pressure medium to said ring when mounted on said valve seat body member to force said ring into tighter engagement with said valve seat body member and a valve body so that said valve seat body member is not readily detachable from the valve body and so that fluid leakage between the valve body and said valve seat body member is prevented.

9. A device a recited in claim 8 wherein said metallic ring is tubular in cross-section.

10. A device as recited in claim 8 wherein said valve seat body member further comprises a first seal insert adapted to provide additional sealing means between said valve seat body member and a valve body in which it may be mounted, and means defining a fluid passage in said valve seat body member for allowing the introduction of material under pressure into engagement with said first insert.

11. A device as recited in claim 8 wherein said valve seat body member further comprises a second seal insert adapted to provide sealing between said valve seat body member and a valve gate which may be located on a side of said valve seat body member opposite a valve body and which is adapted for selectively allowing or preventing the flow of fluid under pressure in bore of a valve body, and means defining a fluid passage in said valve seat body member for allowing the introduction of material under pressure into engagment with said second insert.

* * * * *